United States Patent [19]
Giroir et al.

[11] Patent Number: 6,147,992
[45] Date of Patent: Nov. 14, 2000

[54] CONNECTIONLESS GROUP ADDRESSING FOR DIRECTORY SERVICES IN HIGH SPEED PACKET SWITCHING NETWORKS

[75] Inventors: Didier Giroir, Cagnes-sur-Mer, France; Rachel A. Brue, Kasson, Minn.; Boerge Nilsen, Billingstad, Norway

[73] Assignee: International Business Machines Corporation, Armonk, N.Y.

[21] Appl. No.: 09/007,864

[22] Filed: Jan. 15, 1998

[30] Foreign Application Priority Data

Jan. 21, 1997 [EP] European Pat. Off. .............. 97480001

[51] Int. Cl.$^7$ ................................................... H04L 12/56
[52] U.S. Cl. ........................................... 370/390; 370/401
[58] Field of Search .................................... 370/312, 390, 370/432, 392, 393, 389, 400, 401

[56] References Cited

U.S. PATENT DOCUMENTS

| | | | |
|---|---|---|---|
| 4,760,572 | 7/1988 | Tomikawa ................................. | 370/390 |
| 5,309,433 | 5/1994 | Cidon et al. ............................... | 370/60 |
| 5,361,256 | 11/1994 | Doeringer et al. ....................... | 370/390 |
| 5,608,726 | 3/1997 | Virgile ..................................... | 370/401 |

FOREIGN PATENT DOCUMENTS 0688118  2/1995  European Pat. Off. .

OTHER PUBLICATIONS

Host Groups: A Multicast Extention . . . , Cheriton et al, pp. 172–178.
ACM Transactions on Computer Systems May 1990, #2, "Multicast Routing in Datagram . . . ", Deering et al, p. 85–110.
Multicast Group Membership Management . . . ,Auberbach et al, p. 231–238.
Computer Communications Dec. 1988, #6, "Transactions involving multicast", K Paliwoda, p. 313–318.
European Search Report.

*Primary Examiner*—Douglas W. Olms
*Assistant Examiner*—Ken Vanderpuye
*Attorney, Agent, or Firm*—Gerald R. Woods

[57] ABSTRACT

The present invention relates to connectionless transmission in high speed packet switching networks, and in particular to a group addressing method and system for sending a datagram to one or a plurality of destination nodes and within these nodes for duplicating the datagram and to forward it to multiple end users. The claimed invention takes advantage of a specific data transfer mode called "Remote Access to Functional Addressing" allowing the sending of a datagram to a destination node and within said node, the duplication of said datagram for a transmission towards multiple destinations. By distributing, maintaining and using the required addressing information corresponding to these multiple destinations within the node, the claimed group addressing method and system reduce to a minimum, first, the overhead usually associated with multicast operations in connectionless services, and second, the required amount of manual resource definition as in a given node, only local end users of said node have to be manually defined (unless the connectionless protocol allows for some form of automatic discovery of local resources).

6 Claims, 4 Drawing Sheets

GROUP= (121, 116, 118)

CONNECTIONLESS GROUP ADDRESSING FOR DIRECTORY SERVICES IN HIGH SPEED PACKET SWITCHING NETWORKS

TECHNICAL FIELD

The present invention relates to connectionless transmission in high speed packet switching networks, and in particular to a group addressing method and system for sending a datagram to one or a plurality of destination nodes and within these nodes for duplicating the datagram and forwarding it to multiple end users.

BACKGROUND ART

The telecommunications environment has changed considerably in recent years. A principal reason has been spectacular progress resulting from the maturing of fiber optical transmission technology (high speed rates can now be sustained with very low bit error rates) and the widespread adoption of digital technologies within private and public telecommunications networks.

The service offerings of telecommunications companies, public and private, have also changed. The emergence of high speed transmission capabilities has resulted in more attractive tariffs, more flexibility for users to manage their growth using a wide range of connectivity options, more efficient bandwidth management and better support of new media. Once sampled and digitally encoded, voice, video and image data can be merged with alphanumeric data for common and transparent transport through networks.

A need to efficiently transport mixed traffic streams on very high speed lines imposes new performance and resource requirements for very high throughput, very short packet processing times, efficient flow and congestion control mechanisms, and a flexibility to support a wide range of connectivity options.

A key requirement of high speed packet switching networks is to reduce the end to end delay in order to satisfy real time delivery constraints and to achieve the high system throughput necessary for the transport of voice and video. Increases in link speeds have not been matched by proportionate increases in the processing speeds of communication systems (nodes) and a fundamental challenge for high speed networks is to minimize the processing time and to take full advantage of the high speed/low error rate technologies. Most of the transport and control functions provided by the new high bandwidth network architectures are performed on an end to end basis. The flow control and particularly the path selection and bandwidth management processes are managed primarily at the access points to the network.

Communication networks have at their disposal limited resources to ensure efficient packet transmissions. An efficient bandwidth management process is essential to take full advantage of a high speed network. While transmission costs per byte continue to drop year after year, transmission costs are likely to continue to represent the major expense of operating future telecommunication networks as the demand for bandwidth increases. Thus, considerable efforts have been spent on designing flow and congestion control processes, bandwidth reservation mechanisms, routing algorithms to manage the network bandwidth. An ideal network should be able to transmit all offered to the network until the maximum transmission capacity of the network is reached. Beyond this limit, the network should be able to operate at its maximum capacity whatever the demand is.

In high speed networks, the nodes must provide total connectivity. This includes attachment of the user devices, regardless of vendor or protocol, and the ability to allow each end user communicate with any other device or group of devices when necessary. The network must support any type of traffic including data, voice, video, fax, graphic or image. Nodes must be able to take advantage of all common carrier facilities and to be adaptable to a plurality of protocols. All needed conversions must be automatic and transparent to the end user.

The architectures of most high speed packet switching networks specify a set of generic services that offer end-to-end high bandwidth transport capabilities. Services can be divided into three major areas: Transport Services, Network Control Services and Access Services.

Transport Services provide a common infrastructure to support the transfer of packets across a network. Transport Services are not directly available to users but a invoked through Access Services. Transport Services can be divided in three distinct functions: a Logical Link Layer, a Network Connection Layer and Transport Protocols.

Network Control Services ensure that the Transport and Access Services operate reliably, efficiently, and as automatically as possible. Network Control Services are used to control, allocate, and manage the resources of a network on a real-time basis. They also provide network operators with the various facilities that are needed to configure, operate, and maintain a network on a day-to-day basis. This includes facilities for monitoring the performance of the network, accounting for its usage, and resolving problems.

Access Services provide an interface between the common high speed network (or backbone network) and external devices or networks via access link interfaces. Access Services enable a wide range of external devices to get access to the common infrastructure provided by the Transport Services.

Together, the Transport, Network Control and Access Services provide the capability to support communications between many different types of communicating devices through a common network infrastructure. A major capability of most high speed networks is their ability to support a diverse range of high speed multimedia telecommunication services using common equipment. Each Access Service (also called Access Agent) provides the support for a particular set of telecommunication services—ATM, Frame relay, PCM voice, Circuit emulation, H DLC . . .—and enables those to transport traffic across a common network.

An Access Agent comprises three logically separate components: a protocol agent, which understands and interprets the access protocol, a directory agent in charge of locating resources across the network, and a connection agent which establishes connections between Access Agents.

Each network node contains one or many of these Access Agents, depending on the physical interfaces it attaches to and on the access protocols it understands and supports. Valid examples of access services are Frame Relay or Asynchronous Transfer Mode (ATM) Access Agents (for connection-oriented protocols) or Internet Protocol or Connection-Less Network Protocol Access Agents from the OSI suite (for connectionless protocols).

One distinguishing characteristic of a network (or network protocol) is the presence or absence of a "connection" between end users. When a connection is present the network is called "Connection-oriented" and when there is no connection the network is called "Connectionless". In connection-oriented networks, the transfer of information between two communicating end users starts by the establishment of the connection prior to the real transfer of packets. Once the connection is established, there is no need to place a destination address in the packet header every time a packet is sent. All that is needed is an identifier to specify which connection is to be used for this packet.

When multicasting (sending the same packet to multiple users) is concerned, connection-oriented networks require the establishment of a point-to-multipoint connection network connection between the sending end user (sender) and the receiving end users (receivers). When the communication involves multiple sending end users and multiple receiving end users, a multipoint-to-multipoint connection or several point-to-multipoint connections must be set up.

Packets (also called datagrams in connectionless environments) are freely exchanged between end users (also called subscribers) without any set up phase. Every datagram transmitted is prefixed by the full network address of both its origin and its destination. However, in connectionless networks where the communication duration may be as short (e.g, sending a single datagram) and/or the number of receiving end users is high, the connection-oriented multicasting model with multiple point-to-multipoint or multipoint-to-multipoint connections cannot be efficiently used. It takes time for a network to set up multiparty connections. Since some types of datagrams are delay-sensitive, the multiparty connections would have to be set up in advance, with all the associated problems for maintaining these connections (even when unused).

The present application relates to connectionless transmissions in wide-area networks based for example on the IBM's Networking BroadBand Services architecture described in the publication of International Business Machine "IBM International Technical Support Centers—Networking Broadband Services (NBBS)—Architecture Tutorial—GG24-4486-00 June 95". More particularly, the present application relates to a set of mechanisms that connectionless Access Services can use to provide group addressing ("group addressing" is the terminology used for "multicasting" in the connectionless environment). These mechanisms are used in multi-node networks where each node can offer Access Services supporting connectionless protocols.

Connection-less Protocol Agents exchange datagrams across the network, using the services provided by the generic Transport Services. When a datagram is addressed to a group of several end users, generally attached to the network via different physical interfaces, the datagram is frequently sent to multiple destination nodes and processed by multiple Protocol Agents within said nodes before finally reaching all the end users of the group.

The SMDS "Switched Multimegabit Data Services" architecture and its European equivalent architecture (CBDS "Connectionless Broadband Data Services"), specify that a copy of a group addressed datagram has to be delivered to every physical interface for any group having one or more end users to whom the datagram must be delivered.

The present invention enables optimization of the delivery of group addressed datagrams by minimizing the amount of traffic across the backbone network and processing overhead in the network nodes, and by eliminating single points of failure that are never desirable in a data transport environment.

Several possibilities have been considered for sending the same datagram to multiple destination nodes and then, within the destination node, to one or more destination Protocol Agents. The Source Protocol Agent may send the datagram to each Destination Protocol Agent in the network handling an end user belonging to the group the datagram is destined for. The obvious disadvantage in this case, is the overhead created in the backbone network by the duplication of the datagram. The datagram may be sent once to each destination node that handles an end user member of the group. Of course, this solution involves the intervention of a centralized component in each of these destination nodes for receiving group addressed datagrams from other nodes and for redistributing these datagrams to all concerned local Protocol Agents in the node. Such a solution creates bottlenecks and single points of failure as the group addressing function of each node is concentrated in a single centralized component.

The datagram may be sent once to each destination node that handles an end user member of the group, with a special indication that a copy of the group addressed datagram has to be delivered to all the connectionless Protocol Agents. As the datagram is sent to all the connectionless Protocol Agents of the destination nodes, whether or not they handle an end user member of the group, this solution involves a potential bottleneck for the switch of the nodes and can also create an important burden for connectionless Protocol Agents that do not handle any end user belonging to the group.

All the previously discussed solutions to the connectionless group addressing problem include serious drawbacks. Bottlenecks can be created in the network and/or the network nodes. In some cases, unnecessary single points of failure are introduced. For instance, if the centralized component described above fails, multicasted datagrams can no longer be delivered in the destination node.

SUMMARY OF THE INVENTION

The present invention takes advantage of a specific data transfer mode called "Remote Access to Functional Addressing" allowing the sending of a datagram to a destination node and within said node, the duplication of said datagram for a forwarding towards multiple destinations. By distributing, maintaining and using the required addressing information corresponding to these multiple destinations within the node, the claimed method and system minimize the overhead usually associated with multicast operations and the required amount of manual resource definition as in a given node. Only local end users of said node have to be manually defined (unless the connectionless protocol allows for some form of automatic discovery of local resources).

More particularly, the present application relates to a method for addressing a datagram from an access source node to a group of end users in one or more access destination nodes in a connectionless communication network comprising a plurality of access and transit nodes interconnected with transmission links. A group of end users forms one or more sets of end users, each set of end users being attached to a destination node. For each set of end users attached to a destination node, an intra node multicasting address is defined for duplicating and routing for datagrams in the destination node. Each intra node multicasting address is distributed to all access nodes in the network address for storage in a node directory database. A datagram addressed to a group of end users attached to one or multiple destination nodes by calculating for each destination node a routing path and determining a point-to-point routing label, retrieving from the directory database the intra node multicasting address of each addressed set of end users, concatenating for each destination node, the destination node point-to-point routing label with the intra node multicasting address, and sending the datagram with the concatenated point-to-point routing label and intra node multicasting address towards each destination node.

Each access destination node attaching one or a plurality of sets of end users comprises intra node multicasting addressing means for detecting the intra node multicasting address contained in a received datagram, duplicating the datagram for each end user addressed by said intra node multicasting address, and routing each duplicated datagram towards one of said addressed end users.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

DETAILED DESCRIPTION

Figure 3:
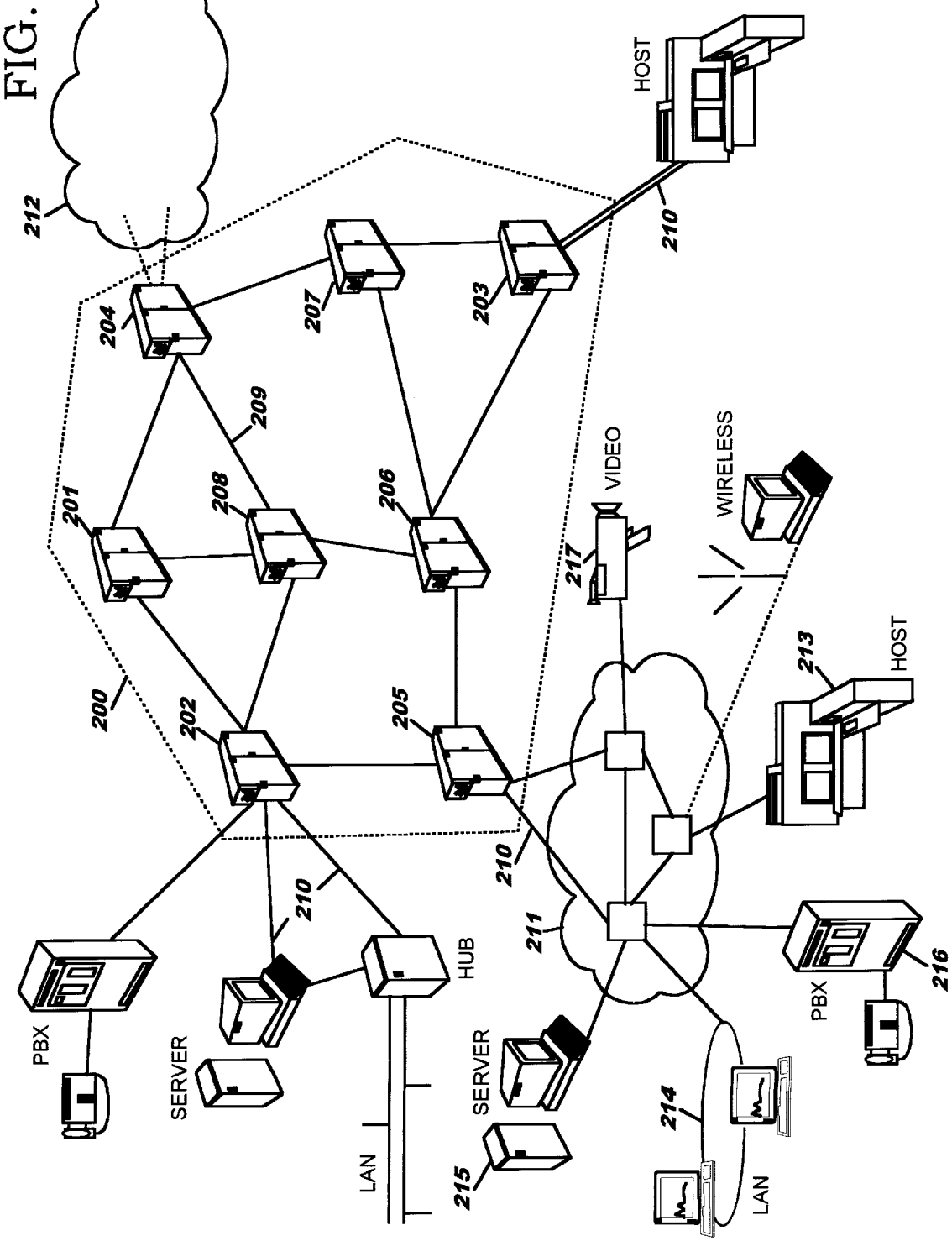
FIG. 3 shows a typical model of a high speed packet switching network including access and transit nodes.

As illustrated in FIG. 3, a typical communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LANs (Local Area Networks) 214, applications servers (215), PBX (Private Branch exchange) 216 or video servers (217). These user networks, spread across different establishments, need to be interconnected through wide area transport facilities. Different approaches or architectures can be used for organizing the transfer of data across the networks. Some architectures emphasize error-free receipt by requiring checking for data integrity at each network node, thus slowing down the transmission. Other architectures emphasize high speed data transfer.

The present invention belongs essentially to the latter category and more particularly to the fast packet switching network architecture detailed in the following paragraphs.

The general view in FIG. 3 shows a fast packet switching transmission system comprising eight nodes (201 to 208) interconnected by means of high speed communication lines called trunks (209). Access (210) to the high speed network by the users is realized through access nodes (202 to 205) located at the periphery. These access nodes include one or more ports, each one providing an access point for attaching external devices supporting standard interfaces to the network and performing the conversions required to transport the users data across the network from and to other external devices. As an example, the access node (202) interfaces respectively a Private Branch exchange (PBX), an application server and a hub through three ports and communicates through the network by means of the adjacent transit nodes (201), (205) and (208). Each network node (201 to 208) includes a routing point where the incoming data packets are selectively routed on outgoing trunks towards the neighboring transit nodes. Routing decisions are made according to information contained in the header of the data packets.

In addition to the basic packet routing function, each network node provides ancillary services such as: determination of routing paths for packets originated in the node, directory services like retrieving and updating information about network users and resources, maintaining of a consistent view of the physical network topology, including link utilization information, and the reservation of resources at access points of the network.

Each port is connected to a plurality of user processing equipment, each user equipment comprising either a source of digital data to be transmitted to another user system, a data sink for consuming digital data received from another user system, or, typically, both. The interpretation of the users protocols, the translation of the user data into packets formatted appropriately for their transmission on the packet network (200) and the generation of a header to route these packets are executed by an access agent running in the port. This header includes control, routing and redundancy check fields. The routing fields contain all the information necessary to route the packet through the network (200) to the destination node to which it is addressed. These fields can take several formats depending on the routing mode specified (connection oriented or connectionless routing mode). The control fields include, among other things, an encoded identification of the protocol to be used in interpreting the routing fields. The redundancy check fields are used to check for errors in the header itself. If an error is detected, the packet is discarded.

Figure 4:
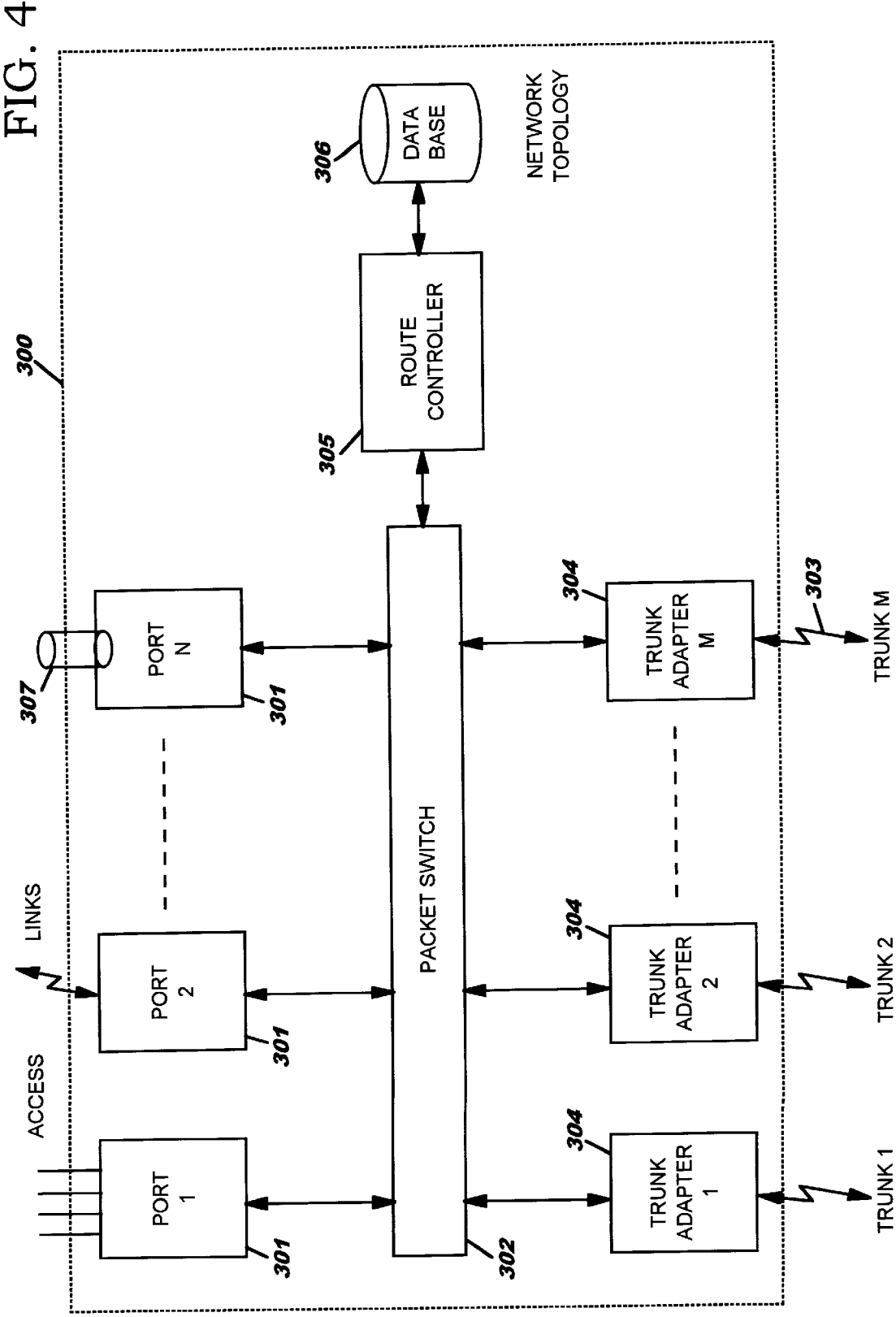
FIG. 4 describes a high speed routing point.

FIG. 4 shows a general block diagram of a typical routing point (300) such as can be found in the network nodes (201 to 208) illustrated in FIG. 3. A routing point comprises a high speed packet switch (302) for receiving packets over high speed transmission links from other nodes in the network The packets are received from other nodes over high speed transmission links (303) via trunk adapters (304), from users via application adapters called ports (301). Using information in the packet header, the adapters (304, 301) determine which packets are to be routed by means of the switch (302) towards a local user network (307) or towards a transmission link (303) leaving the node. The adapters (301 and 304) include queuing circuits for queuing packets prior to or subsequent to their launch on the switch (302).

The route controller (305) calculates the optimum paths through the network (200) so as to satisfy a given set of quality-of-services specified by the user and to minimize the amount of network resources used to complete the communication path. Then, it builds the header of the packets generated in the routing point. The optimization criterion can include such elements as the number of intermediates nodes, the characteristics of the connection request, the capabilities and the utilization levels of the links (trunks) in the path, and the number of intermediate nodes. The optimum route is preferably stored in a routing database(308) for further reuse.

All the information necessary for the routing, about the nodes and transmission links connected to the nodes, are contained in a network topology database (306). Under steady state conditions, every routing point has the same view of the network. The network topology information is updated when new links are activated, new nodes added to the network, when links or nodes are dropped or when link loads change significantly. Such information is exchanged by means of control messages with all other route controllers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet routing point may comprise links from external devices in the local user networks (210) or links (trunks) from adjacent network nodes (209). In any case, the routing point operates in the same manner to receive each data packet and forward it on to another routing point as dictated by the information in the packet header. The fast packet switching network operates to enable communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Network Control Services are those that control, allocate, and manage the resources of the physical network. Each routing point has a set of the foregoing functions in the route controller (305) and uses that set to facilitate the communications (connection-oriented or connectionless) between users applications. The Network Control Services include in particular: directory services for retrieving and maintaining information about network users and resources; bandwidth management services for processing bandwidth reservation and maintenance messages and for monitoring current reservation levels on links; path selection services for choosing the best path between source and destination nodes within the network based on the user's traffic characteristics, quality of service requirements and link utilisation levels; control spanning tree services for establishing and maintaining a routing tree among the network nodes for use in distributing control information (in parallel) including link utilization and for updating the topology databases of the nodes with new network configurations or link/node failures; topology update services for distributing and maintaining, using the spanning tree, information about the logical and physical network (including link utilization information) in every node; congestion control services for enforcing the bandwidth reservation agreements established at set up time between the network's users and the network and for estimating actual bandwidth and for adjusting reservations if necessary during the life of the communication.

Access agents enable external devices or networks to use the network services transparently without a requirement to be aware of the internal network control services and protocols. Access agents interact with external devices or networks using their native protocols and supporting their respective interface standards. They also interact within the network with other access agents of the same type and exploit the network features to provide the best possible service using the minimum amount of resources. Access agents are located in the access nodes and, in a preferred embodiment, in the access link interfaces of the adapters (210) connected to external communication devices.

The external behaviour of a particular access agent is primarily characterized by the protocol agent as it is responsible for participating in protocol exchanges with attached external devices and networks and for mapping those protocols to the protocol used by the backbone network. The protocol agent uses the directory agent to locate the various resources with which it needs to communicate within the network. The protocol agent then uses the connection agent to establish and maintain network connections with other access agents. The interactions between the protocol agent and external devices and networks are generally specific to the type of access agent. For example, the protocol agent in an HDLC access agent will behave quite differently from the protocol agent in an ATM access agent.

The directory agent is responsible for the registration and localization of information relating to services provided by the access agent. The directory agent participates in the directory services Network Control Service which provides a distributed directory service throughout the network. The directory agent performs, in particular, three main functions: registration of users available through its access agent; localization of users on behalf of the protocol agent; and responding to queries to locate users that are received from other directory agents.

Locating a resource means determining the network address of the access agent representing the resource. Directory agents rely on the use of a distributed database. Each directory agent maintains a local database of information about the external resources accessible through its access agent as well as information about remote resources it has cached. Each resource entry includes: an identification of the resource; the characteristics associated with the resource; and the network address information for the resource's protocol, connection and directory agents.

A directory search process begins with an external user, using its native protocol, attempting to communicate with another user. The protocol agent portion of the local access agent receives this request and uses its directory agent to find the destination resources using the external-form address. The directory agent initially examines its database (also called local directory database) : If the resource is found locally, the network address information is verified via point-to-point network control messages (if necessary) and then passed to the protocol agent. If the resource is not found in the database, a query is broadcast to all the directory agents in the directory set to which the destination belongs. Results of the query are cached in the local directory database. The directory agent passes the result to the requesting protocol agent.

The connection agent is responsible for the establishment and ongoing maintenance of network connections that are provided by the network connection layer. The protocol agent uses the connection agent to set up, maintain and take down the various network connections that are required to support the services provided by the access agent.

In a preferred embodiment, there is one connectionless directory agent per node that offers connectionless support and, within each of these nodes, one protocol agent per physical interface linked to a connectionless end user (which generally leads to several protocol agents per node).

Datagrams received from an end user attached to an access node are first processed by the protocol agent of the node. The connectionless access agent's ultimate role is to relay datagrams between end users across the network. These datagrams are sent/received to/from equipment outside the network and contain a routing label that identifies the destination of the datagram. When the routing label is a group address label (as opposed to an individual address label), the datagram is intended to be delivered to a plurality or group of end users (as opposed to one and only one end user).

With the help of a node's connectionless directory agent, the protocol agent in the access node determines, based on the destination group address specified in the datagram, two related pieces of information: first, all the destination nodes that are supposed to receive a copy of the datagram, and second, a functional address for each of these destination nodes. This functional address addresses the protocol agents that own end user members of the destination group in the destination node. How these two important pieces of information are made available to the source protocol agent is explained later.

A node functional address is an intra node group addressing or multicasting information. It is a special label used in a node to specify a plurality instead of a single destination. When the functional address is used as a routing label inside a node, the switch in the node delivers a copy of the datagram being sent to all its corresponding destinations. To become a member of a functional address, a node component (a directory agent or a protocol agent for example) has to "mark" the functional address. Marking a functional address means letting the node switch know that every datagram containing the functional address routing label has to be delivered to the marking entity. The network architecture must reserve a pool of functional addresses to be used for connectionless services. Such a functional address needs to be unique inside a node but does not need to be unique on a network wide basis. Of course, these functional addresses can not only be used in a "remote access to functional address" data transfer mode from outside of the node but they can also be used inside the node to allow the internal multicasting of information to any combination of access agents within the node.

In a preferred embodiment, a functional address may be implemented as a N-bits register value where each of the register bits corresponds to one adapter that attaches to the switch in a node. When a bit is set, the corresponding adapter is a member of the functional address. As an example, functional address x'00011001' means that adapters 1, 4 and 5 (adapters range from 1 to 8) are members of the functional address.

The Remote Access to Functional Address transfer mode is a generic service that allows sending of a datagram in a point-to-point fashion to a destination node, along with a functional address to be used in the destination node to forward the message to local destinations. The point-to-point part is obtained via a source routing label and is determined by the path selection algorithm. For each identified destination node, a point-to-point route must be computed to determine the associated point-to-point routing labels. The functional address is concatenated to the point-to-point routing labels thereby completing the transfer mode "Remote Access to Functional Address". Using this transfer mode, the datagram can then be delivered to all the protocol agents that contain an end user belonging to the group within the destination node. The same process is repeated for each destination node.

Just after its initialization, the connectionless directory agent triggers infrequent but periodic messages across the network to let its peers (other connectionless directory agents of the same type) know about each group address the node locally supports. These messages contain the functional addresses to use in order to reach all the protocol agents in the node that handle a end user member of the subject group. The directory agent obtains the list of locally supported group addresses from the protocol agents located in the node. The way protocol agents obtain the list of group addresses they support is protocol dependent and is outside the scope of this application. Functional addresses can be determined dynamically according to the list of protocol agents supporting the same group address. This is also outside the scope of the present application.

These periodic messages are sent over trees inside the backbone network that link access services of the same type. Alternatively, the CP spanning tree can be used as distribution tree. More details may be found in "Connection-less Directory Services", IBM Technical Disclosure Bulletin. Volume 38 n-9, September 1995. Didier F. Giroir, John P. Streck. Every connectionless directory agent in the network receiving such messages from its peers caches them for further reference when a locally received datagram has to be sent to its destination. Similarly, a point-to-point route towards each destination node can be computed and cached to later on be used to build the "Remote Access to Functional Address" switching label.

The collected information consists of the complete list of all the group addresses supported by the connectionless bearer service network. For each of these group addresses, one functional address per destination node is kept (one per peer node supporting an end user member of the corresponding group). All of this information is then be readily available when a group addressed datagram has to be forwarded to its destination end users.

As the directory messages used to distribute the group address/functional address pairs are sent unreliably over the network, the local nodes' directory databases must be refreshed periodically as some refresh messages may be lost. To remedy this problem of database inconsistencies, the messages containing the set of group addresses supported by each node along with the functional addresses allocated in this node to reach all protocol agents supporting group addresses must be sent periodically. In a preferred implementation, a refresh interval, with a product-specific initial value, is defined as the amount of time a directory agent has to wait between the sending of two consecutive refresh messages. The value of the refresh interval is doubled each time a message is sent, as long as the result remains below a predefined value. When this ceiling value is reached, refreshes originating from the node are stopped. The refresh process resumes (the refresh interval is reset to its minimum value) when any of the following conditions occurs. First, there is a change in the set of functional addresses in a node (for example, a protocol agent disappears or a new protocol agent is initialized). The caches maintained by the peer nodes are updated accordingly. Second, a new node is added to the network and needs to build its own cache. Third, a directory query message from another node is received to search for a resource identified by a group address. In the case where this group address corresponds to one of the local node group addresses, a refresh message has probably been lost by the network.

Additionally, a clock based mechanism may be added to minimize the risk of having several nodes send a refresh message at the same time. For instance, each node can select randomly (within reasonable limits) the time interval between refresh messages. These mechanisms have the effect of reducing the control messages overhead in the network (and will even suppress these in a stable network) and the burden associated with the processing of directory refreshes by the connectionless directory agents.

When a destination node receives a datagram sent across the network via a "Remote Access to Functional Address", the functional address part of the network routing label is exploited to locally deliver the datagram to the set of protocol agents in the node that own an interface leading to one end user member of the group. These protocol agents are the ones that previously marked the functional address contained in the received datagram to the switch. Delivery of the datagram to its destined end users terminates the node's processing of the datagram. When every node of the network involved in the processing of the datagram has done the same processing, the datagram has been successfully processed by the connectionless bearer services network.

Figure 1:
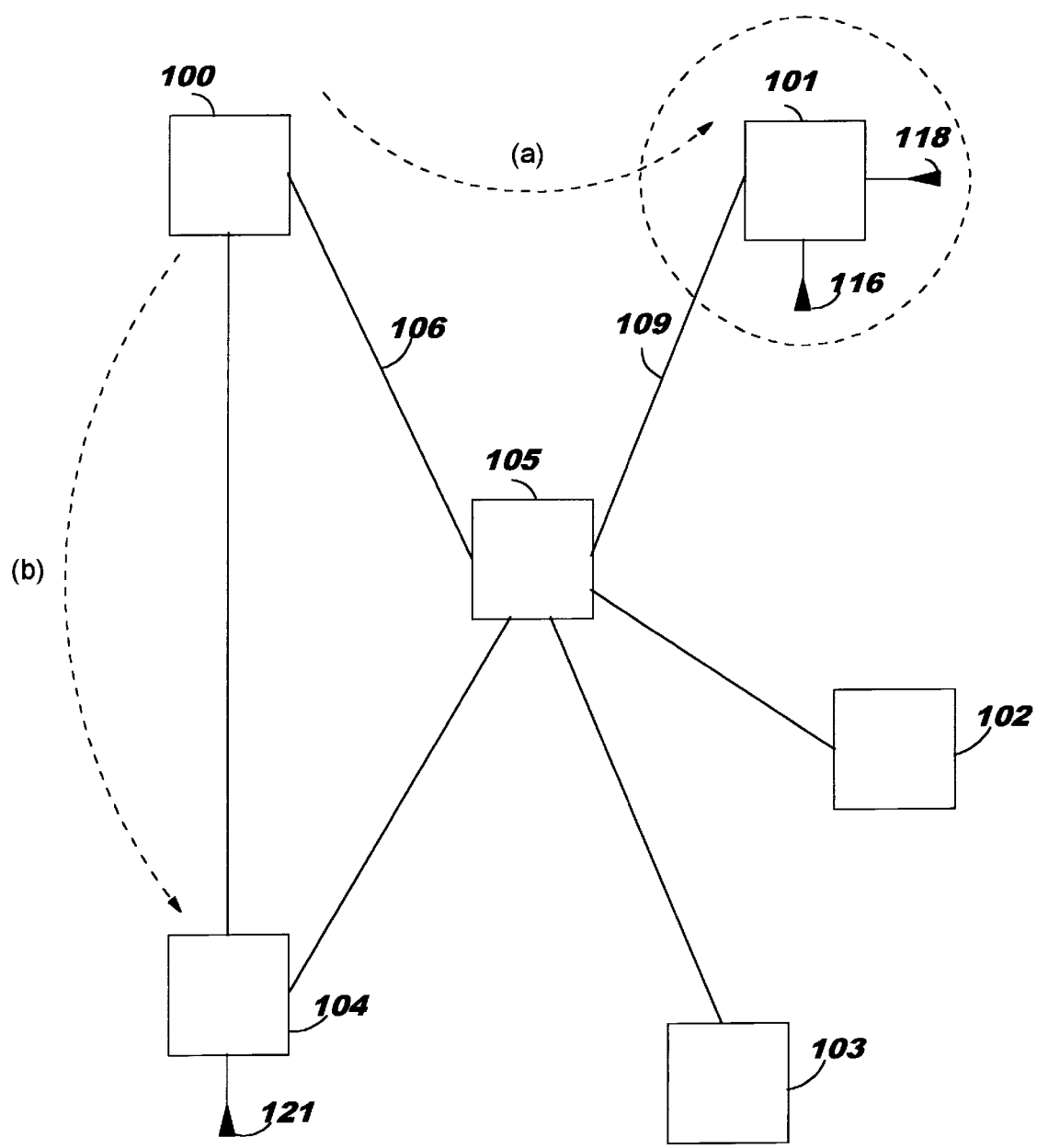
FIG. 1 shows a typical network in which a datagram can be transmitted to a group of end users according to the present invention.
Figure 2:
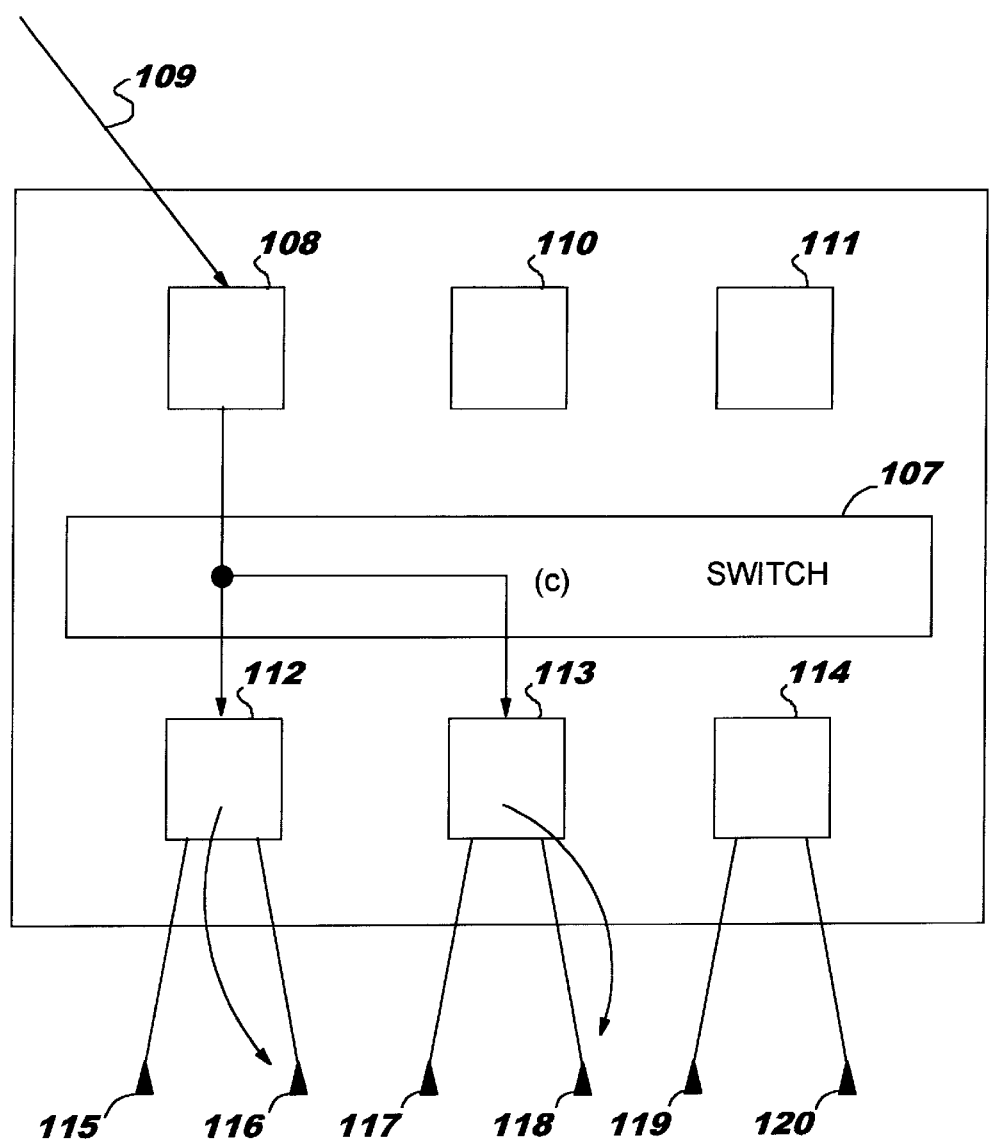
FIG. 2 shows the handling of a multicasted datagram within a destination node according to the present invention.

As example, FIG. 1 shows a network composed of six communication nodes (100 to 105) and FIG. 2 shows the internal structure of node (101). A single copy of the datagram is sent along paths (a) and (b) to each destination nodes—respectively nodes (101) and (104)—handling an end user member of the group. In this particular example, among all end users, the group the datagram is destined for is made up by end users (121), (116) and (118). Inside node (101), the datagram sent (a) by node (100) with a "Remote Access to Functional Address" transfer mode is received by adapter (108) in node (101). The functional address part of the transfer mode is used by adapter (108) to perform a multicast operation (c) over the node switch (107). This multicast operation delivers the datagram to only those destination Protocol Agents in adapters (112) and (113) of the destination node that handle one or more end users belonging to the group. Finally, the datagram is sent to the end users (116) and (118) attached to node (101) and to the end user (121) attached to node (104).

The present invention has to be compared with the known approach of sending of the datagram to all the connectionless protocol agents in every destination node as described in the background section. According to the invention, the point-to-point portion of the data routing label brings the datagram to the destination node and the functional address part of the data routing label brings the datagram to each Protocol Agent that handles one or more end user members of the group the datagram is destined for. This mechanism removes the need for a centralized component in the destination nodes. Each connectionless directory agent distributes to its peers (the other connectionless directory agents in the network) the set of group addresses that it supports. Dynamic distribution of group addressing information minimizes the amount of definition required in the network. In effect, in the worst case, only node local resources have to be manually defined in the node that attaches them. The information associated with group addressing includes, for each supported group address, the functional address to be used in a node that supports it. The functional address specifies the combination of one or more protocol agents in a node owning a resource belonging to the group. Each of these group addresses is accompanied by the Functional Address that the node has allocated to the combination of the connectionless Protocol Agents involved in the processing of this group address. In a node supporting the connectionless service, the node's directory agent caches the lists of group addresses and functional addresses from all peer connectionless nodes in the network. These lists are used to forward the datagrams destined to a group to their final destinations in the most efficient way.

While there has been described what is considered to be a preferred embodiment of the invention, variations and modifications will occur to those skilled in the art once they learn of the preferred embodiment. It is intended that the appended claims shall be construed to include the preferred embodiment and all such variations and modifications that fall within the true spirit and scope of the invention.

What is claimed is:

1. A method for addressing a datagram from an access source node to a group of end users in a connectionless communication network comprising a plurality of access and transit nodes interconnected with transmission links, access nodes attaching one or a plurality of end users, a group of end users comprising one or multiple sets of end users, each set of end users being attached to a destination node, said method involving the steps of:

defining for each set of end users attached to a destination node, an intra node multicasting address for duplicating and routing in the destination node datagrams to the users addressed by said intra node multicasting address, distributing to all access nodes in the network the intra node multicasting address related to each set of end users, storing said intra node multicasting addresses in a directory database within each access node, addressing a datagram destined to a group of end users attached to one or multiple destination nodes according to the further steps of:

identifying each of the destination nodes, for each destination node, selecting a routing path and establishing a point-to-point routing label, retrieving the intra node multicasting address of each addressed set of end users from the directory database, for each destination node, concatenating the destination node point-to-point routing label with the intra node multicasting address, and sending the datagram with the concatenated point-to-point routing label and intra node multicasting address towards each destination node.

2. The method according to claim 1 wherein each access destination node attaching one or a plurality of sets of end users comprises intra node multicasting addressing means for, at reception of a datagram:

detecting the intra node multicasting address contained in the datagram, duplicating said datagram for each end user addressed by said intra node multicasting address, and routing said duplicated datagram towards each of said addressed end users.

3. The method according to claim 2 wherein each access destination node comprises one or a plurality of communication adapters attached to a switch including said intra node multicasting addressing means.

4. The method according to claim 1 wherein the step of distributing to all access nodes in the network the intra node multicasting address related to each group of end users includes the step of periodically sending the intra node multicasting address to all access nodes after a predetermined time period.

5. The method according to claim 4 wherein the time period is increased each time the intra node group address is resent.

6. The method according to claim 5 wherein the step of resending the intra node multicasting address is stopped when the time period reaches a predetermined maximum value.

* * * * *